United States Patent
Kim et al.

(10) Patent No.: US 8,050,215 B2
(45) Date of Patent: Nov. 1, 2011

(54) SCHEDULED POWER-SAVING METHOD IN IEEE 802.16E SYSTEM

(75) Inventors: Min Gon Kim, Daejeon (KR); Min Ho Kang, Seoul (KR)

(73) Assignee: ICU Research and Industrial Cooperation Group, Daejeon (KR)

( * ) Notice: Subject to any disclaimer, the term of this patent is extended or adjusted under 35 U.S.C. 154(b) by 446 days.

(21) Appl. No.: 12/391,055

(22) Filed: Feb. 23, 2009

(65) Prior Publication Data

US 2010/0208636 A1 Aug. 19, 2010

(30) Foreign Application Priority Data

Feb. 16, 2009 (KR) ........................ 10-2009-0012370

(51) Int. Cl.
*H04B 7/185* (2006.01)
*H04B 7/00* (2006.01)
*H04B 1/38* (2006.01)

(52) U.S. Cl. .................... 370/318; 455/522; 455/574

(58) Field of Classification Search .................. 370/318, 370/503; 455/13.14, 522, 574, 127.1, 127.5
See application file for complete search history.

(56) References Cited

U.S. PATENT DOCUMENTS

2005/0047429 A1 * 3/2005 Koo et al. ...................... 370/447
2007/0298836 A1 * 12/2007 Yanover ...................... 455/552.1

* cited by examiner

*Primary Examiner* — Warner Wong
(74) *Attorney, Agent, or Firm* — The Webb Law Firm

(57) ABSTRACT

A method for improving power saving performance of a mobile station in an IEEE 802.16e system is provided. The method includes a first process for determining whether a synchronization condition is satisfied, the synchronization condition being that a service connection newly requested to switch to a sleep mode is low QoS insensitive to delay and there are one or fewer service connection that is in a sleep mode and whose connection type is high QoS sensitive to delay among other service connections; a second process of transmitting to a base station a sleep request message for equalizing a start time of a sleep mode of the service connection to a start time of a next sleep interval of a service connection already in the sleep mode, matching a minimum sleep interval of the service connection to the next sleep interval of the service connection already in the sleep mode, and matching a maximum sleep interval of the service connection to a maximum sleep interval of the service connection already in the sleep mode, for sleep-mode synchronization among a plurality of service connections in a mobile station when the synchronization condition is satisfied; and a third process for switching the service connection to a sleep mode indicated by the sleep request message upon receipt of a sleep response message from a base station in response to the sleep request message.

7 Claims, 4 Drawing Sheets

SCHEDULED POWER-SAVING METHOD IN IEEE 802.16E SYSTEM

BACKGROUND

1. Field of the Invention

The present invention relates to an enhanced power-saving mechanism in an IEEE 802.16e system, and more particularly, to a scheduled power-saving method in an IEEE 802.16e system that improves power-saving performance by extending an unavailable state of a mobile station when two or more service connections in the mobile station are switched to a sleep mode.

2. Discussion of Related Art

IEEE 802.16 defines four service classes to guarantee quality of service (QoS). These are unsolicited grant service (UGS), real-time polling service (rtPS), non-real-time polling service (nrtPS), and best effort service (BES).

A UGS connection should have a higher priority than the other service connections. In the UGS connection, there is no explicit bandwidth request from respective mobile stations (MSs), such as cell phones. Each base station (BS) must periodically guarantee a bandwidth as much as a fixed data size for the UGS connection. UGS is used for applications having a constant bit rate (CBR) characteristic, such as Voice over IP (VoIP) or video conference.

In general, rtPS and nrtPS connections are polled by a unicast polling request. The rtPS takes polling that causes no network congestion or satisfies a delay requirement for a service flow. On the other hand, the ntPS connection takes less polling than when a network congests or operates on a competition basis. That is, since the rtPS takes polling that causes no network congestion or satisfies a delay requirement for a service flow, it is protected from competition-based requests and used for real-time VBR streaming service, such as NPEG video. On the other hand, nrtPS and BES, that are insensitive to packet loss or real time, are used for non-real-time connections.

There are two types of WiMAXs: IEEE 802.16-2004 (or 802.16d) called fixed WiMAX and IEEE 802.16e called mobile WiMAX. The greatest difference between the two profiles is in mobility support, as can be seen from their names. IEEE 802.16e supports mobility while IEEE 802.16-2004 does not support mobility.

IEEE 802.16e supports handover between base stations to guarantee mobility. Another advantage of IEEE 802.16e is that it is IP-based technology. This advantage is great in that as future mobile stations develop toward 4G, all techniques will be shifted into all-IP based techniques.

IEEE 802.16e is attracting attention as technology supporting next-generation mobile networks, and positions itself as a broadband wireless access system for providing long-distance transmission and fast multimedia service in order to replace expensive wired systems due to such advantages.

In the IEEE 802.16e system, battery-driven mobile stations require a power saving mechanism to guarantee mobility by overcoming a limited amount of power.

The IEEE 802.16e system basically simultaneously supports several service connections. Each service connection performs a unique operation depending on applications. Then, several service connections may simultaneously switch to a sleep mode. According to a standard power-saving mechanism, when one service connection is in a sleep state and the other service connection is in a listening state, a mobile station moves to an available state and consumes power.

As such, when several service connections simultaneously switch to a sleep mode, a situation in which one service connection is in a sleep state and the other is in a listening state occurs frequently. A conventional technique cannot properly cope with this situation, and thus the mobile station moves to an available state and consumes power, reducing a lifetime of a battery.

SUMMARY OF THE INVENTION

The present invention is directed to a method capable of extending an unavailable state of a mobile station through synchronization to a service connection already operating in a sleep mode in performing service connection operation in response to a new request for the sleep mode.

According to an aspect of the present invention, there is provided a scheduled power saving method in an IEEE 802.16e system, the method including: a first process for determining whether a synchronization condition is satisfied, the synchronization condition being that a service connection newly requested to switch to a sleep mode is low QoS insensitive to delay and there are one or fewer service connections that are in a sleep mode and whose connection type is high QoS sensitive to delay among other service connections; a second process of transmitting to a base station a sleep request message for equalizing a start time of a sleep mode of the service connection to a start time of a next sleep interval of a service connection already in the sleep mode, matching a minimum sleep interval of the service connection to the next sleep interval of the service connection already in the sleep mode, and matching a maximum sleep interval of the service connection to a maximum sleep interval of the service connection already in the sleep mode, for sleep-mode synchronization among a plurality of service connections in a mobile station when the synchronization condition is satisfied; and a third process for switching the service connection to a sleep mode indicated by the sleep request message upon receipt of a sleep response message from a base station in response to the sleep request message.

The method may further include a process of transmitting to the base station a sleep request message including a minimum sleep interval and a maximum sleep interval determined by an application according to a standard mechanism in consideration of a unique characteristic of the service connection, instead of omitting the sleep-mode synchronization among a plurality of service connections in the mobile station when the synchronization condition is not satisfied.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 4(*b*) illustrates a state of a service connection for BES according to the present invention; and FIG. 4(*c*) illustrates an entire state of a mobile station according to the present invention.

DETAILED DESCRIPTION OF EXEMPLARY EMBODIMENTS

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

Figure 1:
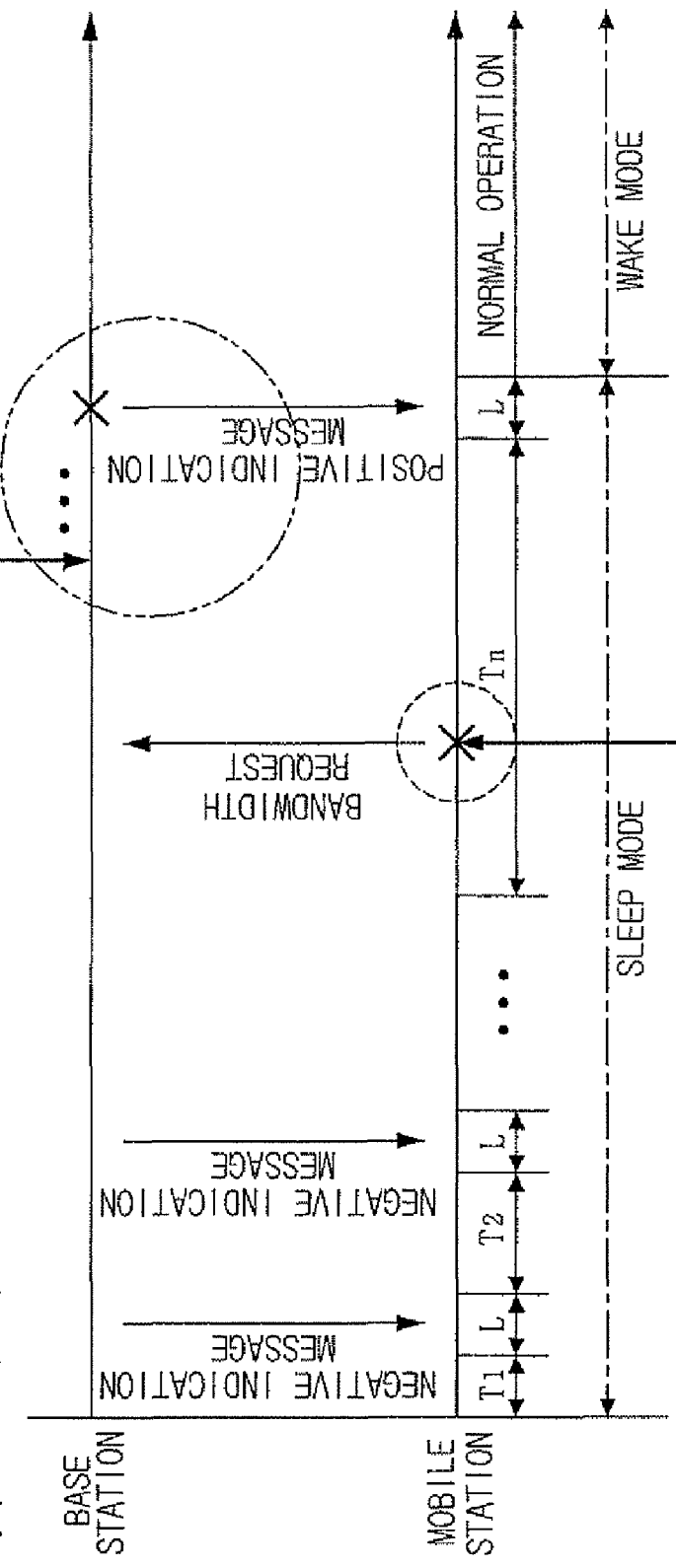
FIG. 1 is a flow diagram illustrating operation between a base station and a mobile station in a sleep mode defined in IEEE 802.16e.

Operation between a base station and a mobile station in a sleep mode defined in IEEE 802.16e will now be described with reference to FIG. 1.

When a first sleep period (T1) equal to a minimum sleep period has lapsed, the mobile station is put in a listening state to await an indication message from the base station. The indication message includes information indicating whether there is traffic to be transmitted from the base station to the mobile station during the sleep period. For example, a negative indication message indicates that there is no traffic (Protocol Data Unit (PDU)) to be transmitted from the base station to the mobile station, and a positive indication message indicates that there is traffic to be transmitted from the base station to the mobile station. That is, when the indication message is a negative indication message, the sleep mode remains unchanged and a next sleep period has a duration twice that of a previous sleep period. This process is repeatedly performed until the sleep period reaches a maximum sleep period. Then, the sleep period remains at the maximum sleep period until the positive indication message is received to wake the mobile station. When the positive indication message is received, the sleep mode ends and the mobile station switches to a normal operation mode (i.e., a wake mode). In particular, since the indication message is not transmitted until the base station reaches a listening period (L), it causes response delay. A longer sleep period contributes to improvement of power saving performance but increases response delay. Accordingly, a moderate sleep period is required.

Meanwhile, when the mobile station has data to transmit to the base station, it switches from the sleep mode to the normal operation mode by itself irrespective of the indication message. The mobile station then transmits a message to the base station to request bandwidth assignment. Since switching to the normal operation mode is performed irrespective of its state, no response delay occurs. Therefore, a longer sleep period contributes to better power-saving performance.

Thus, power management performance for the mobile station relating to the power saving effect and the response delay depends on set values of a minimum sleep period, a maximum sleep period, and a listening period. For example, a sleep mode operation with relatively small minimum and maximum sleep periods causes corresponding small response delay but consumes more power. This is because listening periods consuming much energy in the sleep mode become relatively longer. On the other hand, a sleep mode operation with relatively long minimum and maximum sleep periods causes corresponding long response delay but consumes less power. This phenomenon occurs because the minimum and maximum sleep periods affect a total listening time and response delay during the sleep mode. Therefore, it is necessary to properly adjust the two parameters for desirable power management.

Figure 2:
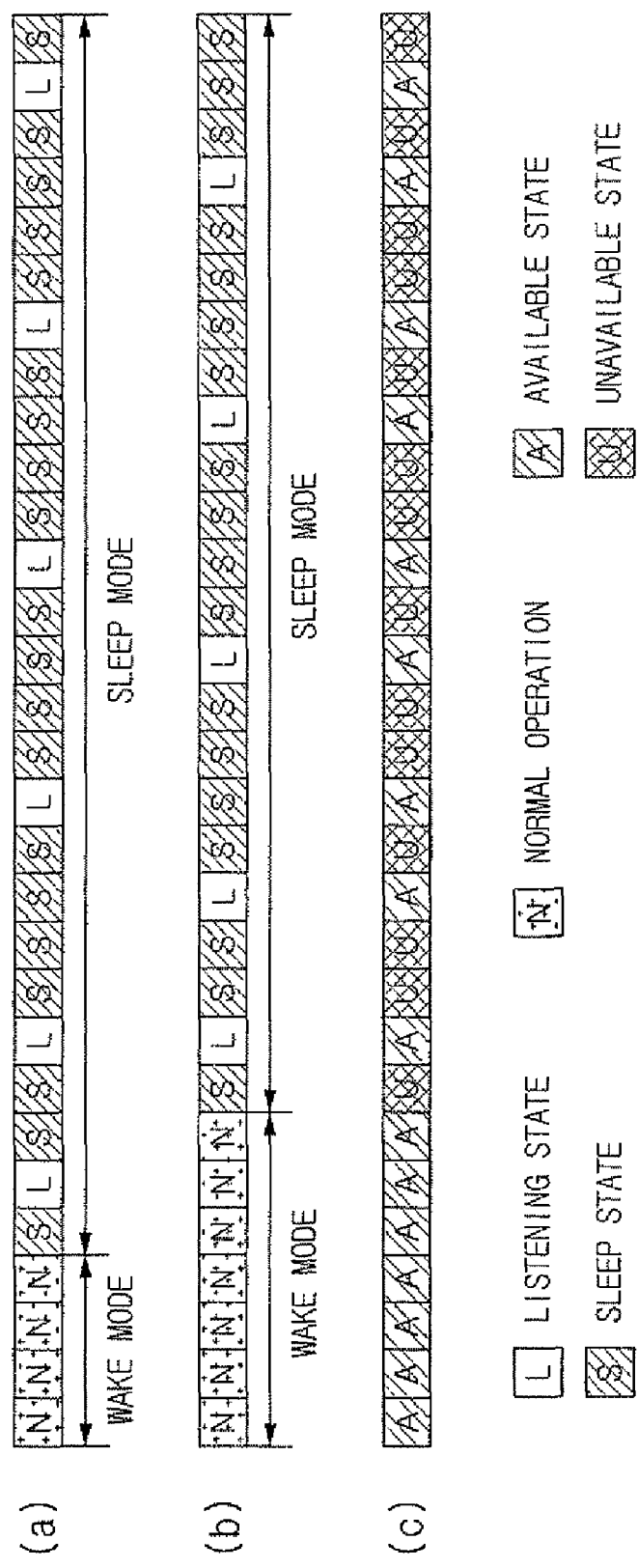
FIG. 2(a) illustrates a state of a service connection for unsolicited grant service (UGS)
FIG. 2(b) illustrates a state of a service connection for best effort service (BES)
FIG. 2(c) illustrates an entire state of a mobile station.

FIG. 2 illustrates states of respective service connections and a mobile station according to a standard power-saving mechanism when two service connections switch to a sleep mode.

Specifically, FIG. 2(*a*) illustrates a state of a service connection for unsolicited grant service (UGS) (a first service connection) (Tmin=1 unit of time, Tmax=4 unit of time), FIG. 2(*b*) illustrates a state of a service connection for best effort service (BES) (a second service connection) (Tmin=1 unit of time, $T_{max}$=4 unit of time), and FIG. 2(*c*) illustrates an entire state of the mobile station.

As shown in FIG. 2, since the mobile station operates in a unique sleep mode for each service connection, it moves to an available state A when one service connection is in a sleep state S while the other is in a listening state L even though the service connections are both in the sleep mode, such that there is no substantial power saving effect by the sleep mode operation.

Accordingly, in the present invention, when a service connection operation is performed in response to a new request for the sleep mode, the service connection is synchronized to a service connection already in the sleep mode to extend an unavailable state of the mobile station. This process will be described in detail with reference to FIG. 3.

First, a determination is made as to whether there is a service connection newly requested to switch to the sleep mode (e.g., a second service connection). When there is a service connection newly requested to switch to the sleep mode, the mobile station determines whether a connection type of the second service connection is high QoS sensitive to delay or low QoS insensitive to delay (S1 and S2).

When the connection type of the second service connection newly requested to switch to the sleep mode is high QoS sensitive to delay, such as urgent grant service (UGS) or real-time polling service (rtPS), the mobile station determines that a synchronization condition that the second service connection and the first service connection already operating in the sleep mode match in operation is not satisfied. Accordingly, in this case, the mobile station transmits, to the base station, a sleep request message including a minimum sleep interval (Tmin) and a maximum sleep interval (Tmax) determined by an application according to a standard mechanism in consideration of a unique characteristic of the service connection (S3).

Upon receipt of a sleep response message from the base station in response to the sleep request message, the mobile station switches the service connection to the sleep mode (S4 and S5).

Accordingly, the operation for matching the second service connection newly requested to switch to the sleep mode to the service connection already operating in the sleep mode (e.g., the first service connection) to switch to the sleep mode is not performed in the process (S3-85).

When it is determined in the second step (S2) that the connection type of the second service connection newly requested to switch to the sleep mode is low QoS insensitive to delay, such as non-real-time polling service (nrtPS) or BES, the mobile station determines whether there are one or fewer service connections that are in the sleep mode and whose connection type is high QoS among other service connections (S6).

When it is determined in the step S6 that there are two or more service connections that are in the sleep mode and whose connection type is high QoS among the other service connections, the mobile station determines that the synchronization condition that the second service connection and the first service connection already operating in the sleep mode match in operation is not satisfied. Accordingly, the mobile station performs the process (S3-S5) to switch the second service connection to the sleep mode.

However, when it is determined in the step S6 that there are one or fewer service connections that are in the sleep mode and whose connection type is high QoS, that is, that only one service connection whose service type is high QoS among the other service connections is in the sleep mode or only connections whose service type is low QoS are in the sleep mode, the mobile station determines that the synchronization condition that the second service connection and the first service connection already operating in the sleep mode match in operation is satisfied. In this case, $T_{nxt}^E$, $T_{max}^E$ and $S_{nxt}^E$ values are set (S7).

$T_{nxt}^E$ denotes a next sleep interval of the existing service connection in the steep mode (i.e., the first service connection), $T_{max}^E$ denotes a maximum sleep interval ($T_{max}$) of the existing service connection in the sleep mode, and $S_{nxt}^E$ denotes a start time of a next sleep interval of the existing service connection in the sleep mode.

To equalize a start time of a sleep mode of the second service connection to a start time of the next sleep interval of the first service connection already operating in the sleep mode, the mobile station waits until the start time ($S_{nxt}^E$) of the next sleep interval of the second service connection arrives (S8).

The mobile station then transmits to the base station a sleep request message for equalizing the start time of a sleep mode of the second service connection with the start time of the next sleep interval of the first service connection, matching the minimum sleep interval of the second service connection to a next sleep interval of the first service connection, and matching the maximum sleep interval of the second service connection to the maximum sleep interval of the first connection (S9).

Upon receipt of the sleep response message from the base station, the mobile station switches the second service connection to the sleep mode indicated by the sleep request message (S4 and S5).

By doing so, the second service connection newly requested to switch to the sleep mode may match (be synchronized) to the service connection already operating in the sleep mode (e.g., the first service connection) to switch to the sleep mode.

When the condition is not satisfied in the step S6, the operation for matching the second service connection newly requested to switch to the sleep mode to the service connection already operating in the sleep mode (e.g., the first service connection) to switch to the sleep mode is not performed. This is intended to prevent negative influences on a high QoS characteristic, and particularly, increase of response delay.

Figure 3:
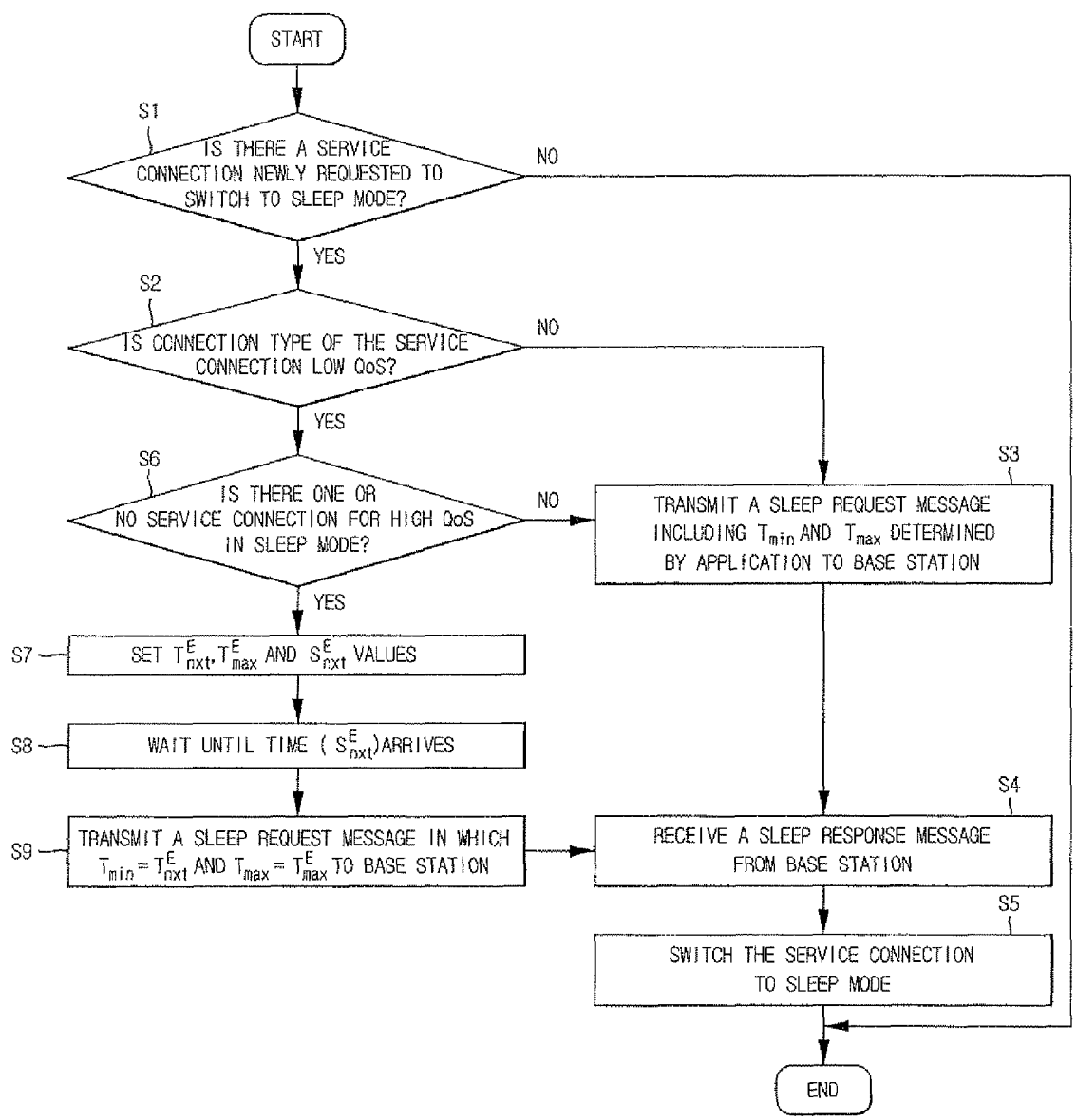
FIG. 3 is a flowchart illustrating a scheduled power saving method in an IEEE 802.16e system according to the present invention.
Figure 4:
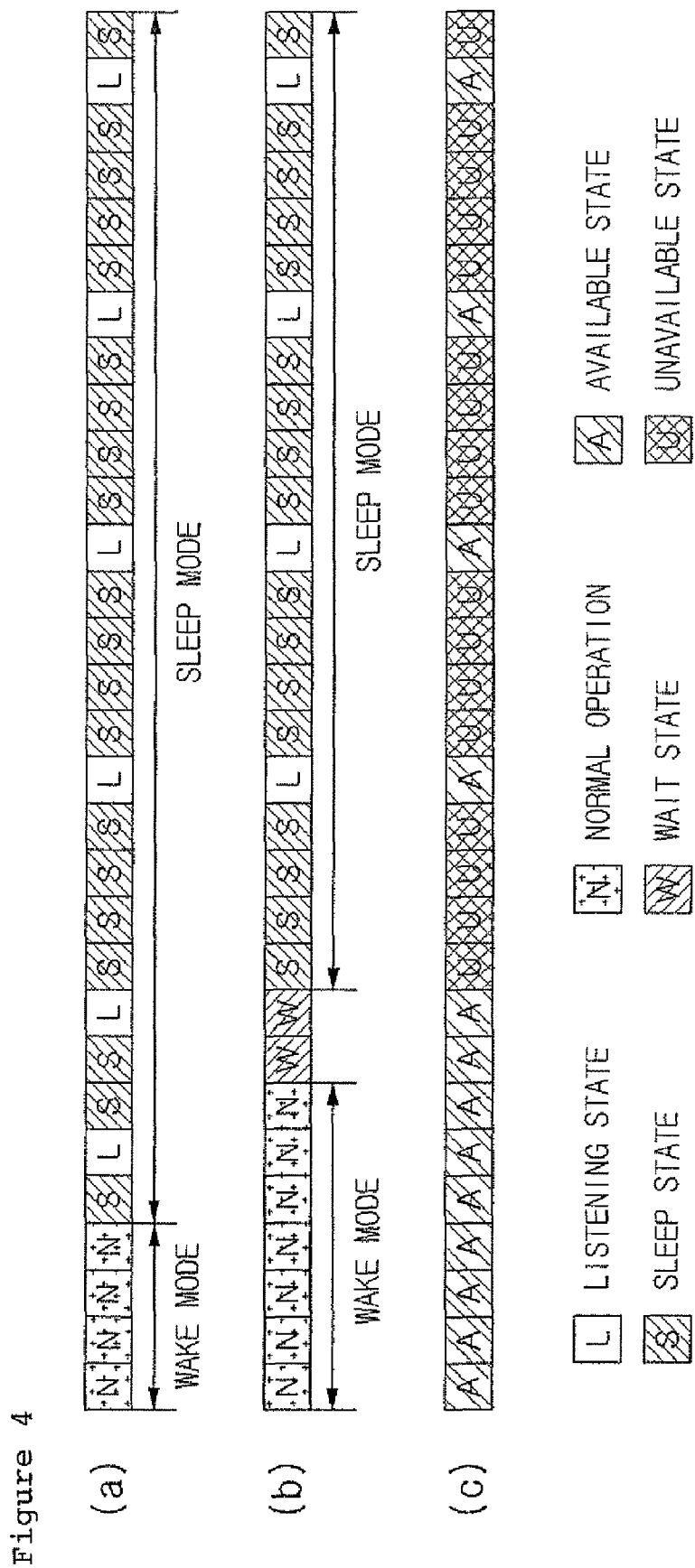
FIG. 4(*a*) illustrates a state of a service connection for UGS according to the present invention.

FIG. 4 illustrates states of respective connections and a mobile station when two service connections switch to a sleep mode according to the power-saving mechanism of the present invention in FIG. 3. When the power-saving mechanism according to the present invention is applied, listening states (L) of the two service connections in the sleep mode match, as shown in FIGS. 4(a) and (b). Accordingly, it can be seen that the unavailable state (U) is extended, from a comparison between FIG. 4(c) and FIG. 2(c), which illustrate the entire state of the mobile station. The power-saving effect increases by the extended unavailable state.

According to the present invention, sleep mode synchronization is performed on a plurality of service connections in the IEEE 802.16e system simultaneously supporting several service connections, thereby relatively extending the unavailable state of the mobile station and improving the power saving performance.

Sleep mode synchronization is applied only to low QoS insensitive to delay in consideration of each QoS connection type characteristic defined in the IEEE 802.16e, thereby preventing delay increase from adversely affecting a unique operation of a high QoS service connection.

It will be apparent to those skilled in the art that various modifications can be made to the above-described exemplary embodiments of the present invention without departing from the spirit or scope of the invention. Thus, it is intended that the present invention cover all such modifications provided they come within the scope of the appended claims and their equivalents.

What is claimed is:

1. A scheduled power saving method in an IEEE 802.16e system, the method comprising:
    a first process for determining whether a synchronization condition is satisfied, the synchronization condition being that a service connection newly requested to switch to a sleep mode is low QoS insensitive to delay and there are one or fewer service connections that are in a sleep mode and whose connection type is high QoS sensitive to delay among other service connections;
    a second process of transmitting to a base station a sleep request message for equalizing a start time of a sleep mode of the service connection to a start time of a next sleep interval of a service connection already in the sleep mode, matching a minimum sleep interval of the service connection to the next sleep interval of the service connection already in the sleep mode, and matching a maximum sleep interval of the service connection to a maximum sleep interval of the service connection already in the sleep mode, for sleep-mode synchronization among a plurality of service connections in a mobile station when the synchronization condition is satisfied; and
    a third process for switching the service connection to a sleep mode indicated by the sleep request message upon receipt of a sleep response message from a base station in response to the sleep request message.

2. The method of claim 1, wherein the first process comprises:
    determining whether there is the service connection newly requested to switch to a sleep mode;
    determining whether the service connection is low QoS; and
    determining whether there are one or fewer service connections that are in a sleep mode and whose connection type is high QoS among the other service connections.

3. The method of claim 1, wherein the low QoS comprises non-real-time polling service (nrtPS) or best effort service (BES).

4. The method of claim 1, wherein the high QoS comprises urgent grant service (UGS) or a real-time polling service (rtPS).

5. The method of claim 1, further comprising: a process of transmitting to the base station a sleep request message including a minimum sleep interval and a maximum sleep interval determined by an application according to a standard mechanism, instead of omitting the second process when the synchronization condition is not satisfied.

6. The method of claim 1, wherein the second process further comprises: setting a next sleep interval of other service connection in the sleep mode, a maximum sleep interval of the other service connection, and a start time of a next sleep interval of the other service connection.

7. The method of claim 1, wherein the synchronization comprises matching a listening state in the sleep mode between the service connection and the other service connection.

* * * * *